/

US 12,311,935 B2

(12) United States Patent
Suzuki et al.

(10) Patent No.: US 12,311,935 B2
(45) Date of Patent: May 27, 2025

(54) VEHICLE SPEED CONTROL DEVICE

(71) Applicant: HONDA MOTOR CO., LTD., Tokyo (JP)

(72) Inventors: Noriaki Suzuki, Tokyo (JP); Kazuya Sakurai, Tokyo (JP); Tetsuya Suko, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 18/325,303

(22) Filed: May 30, 2023

(65) Prior Publication Data

US 2023/0391329 A1 Dec. 7, 2023

(30) Foreign Application Priority Data

Jun. 2, 2022 (JP) ................. 2022-090151

(51) Int. Cl.
*B60W 30/14* (2006.01)
(52) U.S. Cl.
CPC ..... *B60W 30/143* (2013.01); *B60W 2540/106* (2013.01); *B60W 2720/10* (2013.01)
(58) Field of Classification Search
CPC ................................................. B60W 30/143
See application file for complete search history.

(56) References Cited

U.S. PATENT DOCUMENTS

2020/0398674 A1* 12/2020 Kobayashi ............ B60W 10/04

FOREIGN PATENT DOCUMENTS

JP 2021-002980 A 1/2021

* cited by examiner

*Primary Examiner* — Imran K Mustafa
(74) *Attorney, Agent, or Firm* — Rankin, Hill & Clark LLP

(57) ABSTRACT

A vehicle speed control device is configured to: acquire an AP opening rate of an accelerator pedal of a vehicle; perform deceleration control according to an AP opening rate-target driving force characteristic; when an operation element is operated for deceleration in a state where pressing on the accelerator pedal has been released, change the characteristic to a second characteristic representing, for a deceleration force to be applied due to the release of pressing on the accelerator pedal, a second deceleration force larger than a first deceleration force that is based on the before-change characteristic; and terminate the deceleration control according to the second characteristic when a target driving force that is based on a result of applying the AP opening rate to the second characteristic has reached a target driving force that is to be applied at the release of pressing on the accelerator pedal according to the before-change characteristic.

2 Claims, 5 Drawing Sheets

VEHICLE SPEED CONTROL DEVICE

CROSS REFERENCE TO RELATED APPLICATIONS

This application claims foreign priority to Japanese Patent Application No. 2022-090151, filed Jun. 2, 2022, the disclosure of which is incorporated herein by reference in its entirety.

TECHNICAL FIELD OF THE INVENTION

The present invention relates to a vehicle speed control device that performs deceleration control of an own vehicle.

BACKGROUND ART

The applicant of this application has disclosed a technique of controlling the speed of an own vehicle in Patent Literature 1, for example.

The vehicle speed control technique disclosed in Patent Literature 1 involves controlling deceleration using a device called a deceleration level selector in an electric automobile equipped with a motor for traveling, for example.

The deceleration level selector includes an operation element called paddle, which is disposed on a steering wheel to be used for adjusting deceleration. See, for example, paragraphs 0028 and 0041 and FIG. 2A of Patent Literature 1.

The vehicle speed control technique described in Patent Literature 1 is useful for cases where the driver wishes to slightly decelerate the vehicle without pressing down the brake pedal as the flow of vehicles begins to stagnate while driving on an expressway at a cruising speed. Specifically, in those cases the driver will operate the paddle in a state where the driver has released the pressing on the accelerator pedal. This triggers an adjustment of increasing the deceleration force, which is based on the regenerative braking force of the motor for traveling, to be applied to the own vehicle.

With the vehicle speed control technique described in Patent Literature 1, it is possible to perform appropriate vehicle speed control in cases where the driver wishes to slightly decelerate the vehicle without pressing down the brake pedal.

RELATED ART DOCUMENT

Patent Literature

Patent Literature 1: Japanese Laid-Open Patent Publication No. 2021-2980

SUMMARY OF THE INVENTION

According to the above-described conventional vehicle speed control technique, the deceleration control triggered in response to the operation on the paddle is terminated when it can be considered that the stagnation of the flow of vehicles has been resolved, i.e., when the travel state of the own vehicle has reverted to a travel state where the own vehicle is traveling at the original cruising speed. Specifically, the deceleration control triggered in response to the operation on the paddle is terminated when the amount of pressing down the accelerator pedal (hereinafter sometimes referred to as "an AP opening rate") exceeds a predetermined threshold value corresponding to a value required to maintain a target vehicle speed. In this way, the AP opening rate-target driving force characteristic, which has been changed to increase responsiveness for the deceleration control performed in response to the paddle operation, is reverted to the original characteristic.

When adopting the timing at which the AP opening rate exceeds the predetermined threshold value as the timing of terminating the deceleration control triggered in response to the operation on the paddle, there is an issue of determining the predetermined threshold value based on what guideline.

If the predetermined threshold value is set as a relatively high value, the deceleration control triggered in response to the paddle operation continues during the time until the timing of termination occurs. Then, the driver may possibly feel a sense of discomfort on the high responsiveness of the driving force with respect to the AP opening rate. In this regard, there is room for improvement.

The present invention has been made in view of the above-described circumstances and it is an object of the present invention to provide a vehicle speed control device capable of achieving vehicle speed control that does not cause the driver to feed a sense of discomfort even when performing deceleration control using a deceleration operation element.

To achieve the above-described object, an aspect of an embodiment according to the present invention is a vehicle speed control device implemented using one or more hardware processors, the vehicle speed control device including: an information acquisition section implemented using one or more of the one or more hardware processors and configured to acquire information on an AP opening rate representing an opening rate of an accelerator pedal which is to be operated to input a request for accelerating a vehicle; a target driving force setting section implemented using one or more of the one or more hardware processors and configured to set an AP opening rate-target driving force characteristic representing a target driving force to be applied to the vehicle for at least the AP opening rate; and a deceleration controller implemented using one or more of the one or more hardware processors and configured to perform deceleration control according to the AP opening rate-target driving force characteristic, wherein the deceleration controller is further configured to, when a deceleration operation element provided in the vehicle is operated for deceleration in a state where pressing on the accelerator pedal has been released, change the AP opening rate-target driving force characteristic to a second AP opening rate-target driving force characteristic, the AP opening rate-target driving force characteristic before change being a first AP opening rate-target driving force characteristic, wherein the second AP opening rate-target driving force characteristic represents, for a deceleration force to be applied due to the release of pressing on the accelerator pedal, a second deceleration force larger than a first deceleration force that is based on the first AP opening rate-target driving force characteristic, and wherein the deceleration controller is further configured to terminate the deceleration control according to the second AP opening rate-target driving force characteristic when a target driving force that is based on a result of applying the AP opening rate to the second AP opening rate-target driving force characteristic has reached a target driving force that is to be applied at the release of pressing on the accelerator pedal according to the first AP opening rate-target driving force characteristic.

With the vehicle speed control device of the embodiment according to the present invention, it is possible to achieve vehicle speed control that does not cause the driver to feed a sense of discomfort even when performing deceleration control using a deceleration operation element.

DETAILED DESCRIPTION OF EMBODIMENT

Figure 1A:
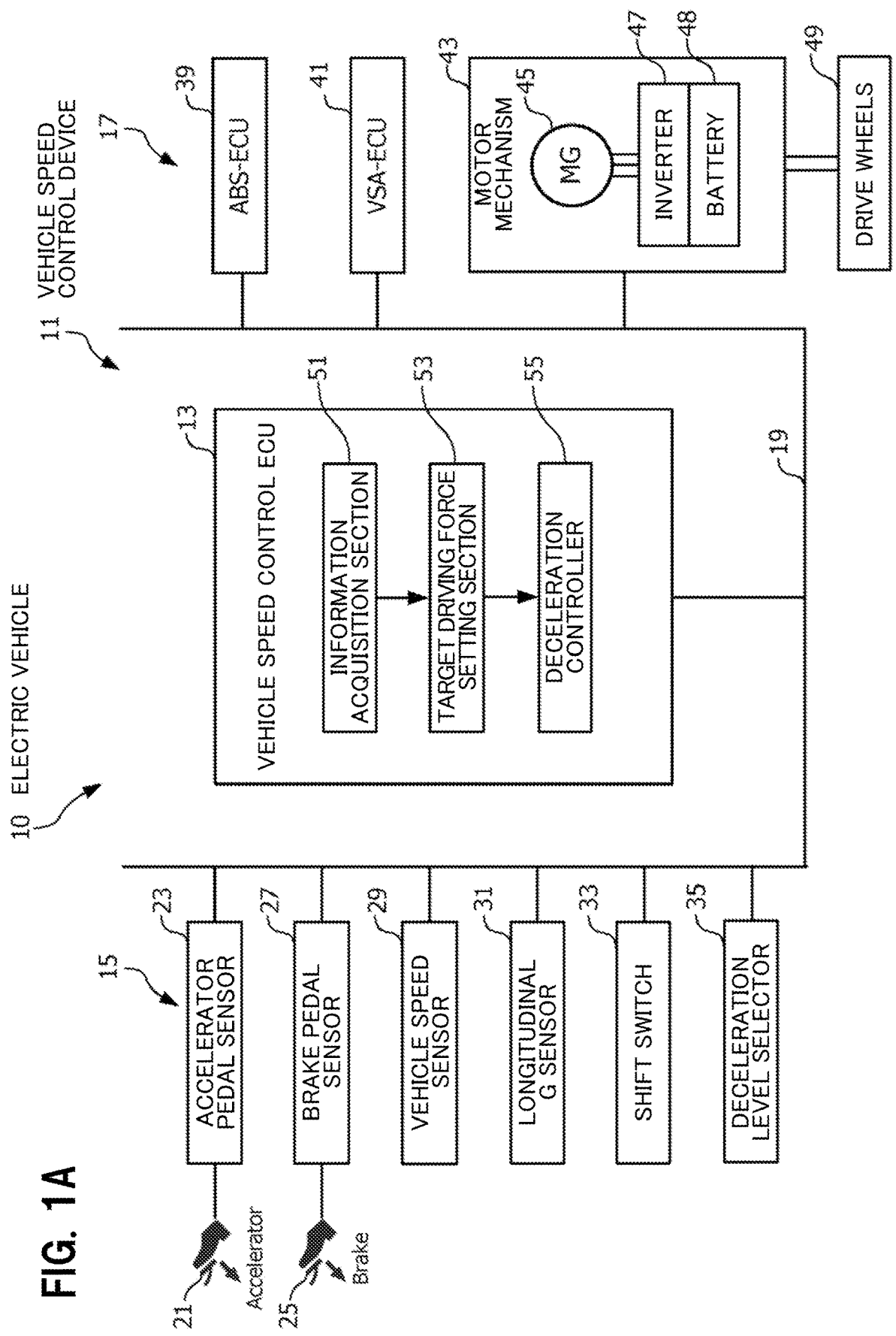
FIG. 1A is a block configuration diagram schematically illustrating a vehicle speed control device according to an embodiment of the present invention.

Hereinafter, a vehicle speed control device according to an embodiment of the present invention will be described in detail with reference to the drawings as appropriate.

In the drawings attached, basically, members sharing common functions, or members having functions corresponding to one another are denoted by the same reference sings. In addition, for the purpose of explanatory convenience, sizes and shapes of characteristic curves are sometimes schematically shown with deformation or exaggeration.

Figure 1B:
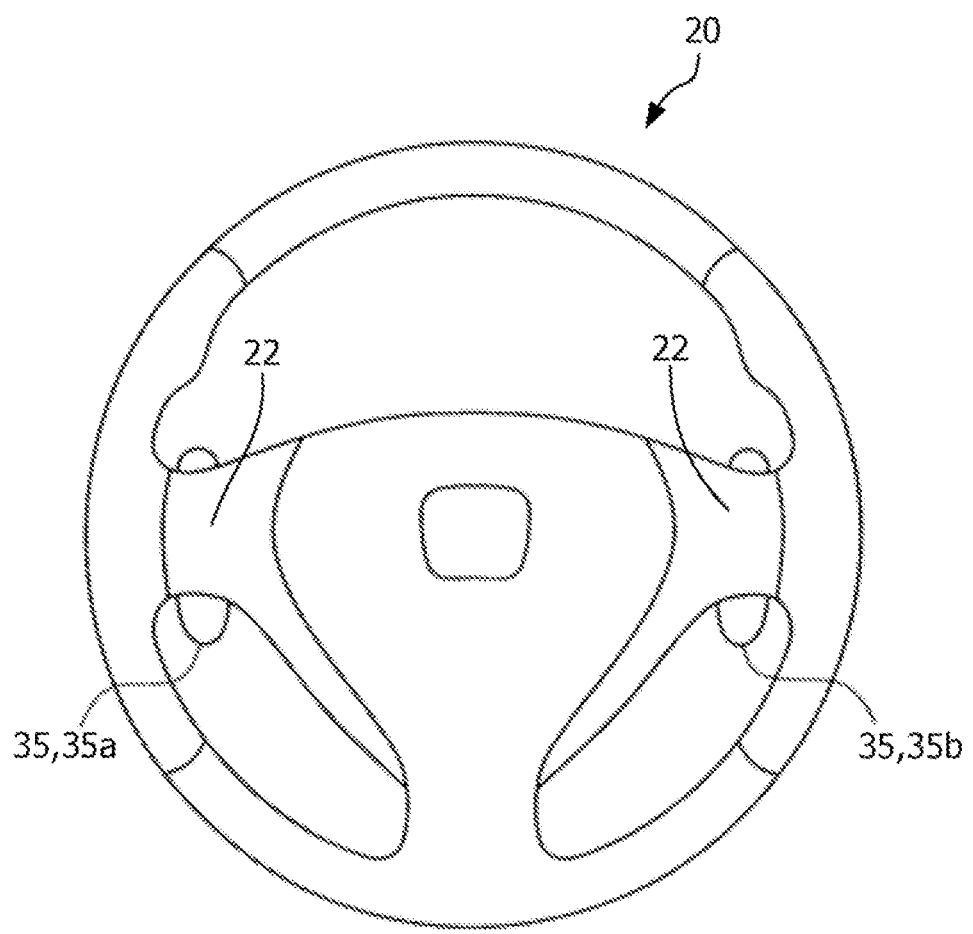
FIG. 1B is an exterior view of paddles serving as operation switches of a deceleration level selector disposed on a steering wheel.

Overview of Vehicle Speed Control Device 11 According to Embodiment of Present Invention A description will be given of a vehicle speed control device 11 according to an embodiment of the present invention with reference to FIGS. 1A and 1, taking as an example of electric vehicle 10 an electric vehicle having a motor 45 for driving vehicle wheels. Note that the electric vehicle corresponds to the "vehicle" of the present invention. FIG. 1A is a block configuration diagram schematically illustrating the vehicle speed control device 11. FIG. 1B is an exterior view of paddles 35a and 35b serving as operation switches of a deceleration level selector 35 disposed on a steering wheel 20.

As illustrated in FIG. 1, the vehicle speed control device 11 includes a vehicle speed control electronic control unit (ECU) 13, an input system 15, and an output system 17, which are connected so as to exchange information with one another via a communication medium 19 such as a Control Area Network (CAN).

The vehicle speed control ECU 13 is implemented using microcomputer(s) including central processing unit(s) (CPUs), read only memory(ies) (ROMs), random access memory(ies) (RAMs) and the like. Each of the microcomputer(s) is programmed to load programs and information stored in the ROM and execute the programs to perform control of various functions of the vehicle speed control ECU 13.

The vehicle speed control electronic control unit (ECU) 13 functions primarily to control the speed of the electric vehicle 10. Internal configuration of the vehicle speed control ECU 13 will be described in detail later.

As illustrated in FIG. 1, the communication medium 19 is connected with, as the input system 15, an accelerator pedal sensor 23, a brake pedal sensor 27, a vehicle speed sensor 29, a longitudinal G sensor 31, a shift switch 33, and a deceleration level selector 35.

The accelerator pedal sensor 23 functions to detect whether an accelerator pedal 21, which is used when accelerating/decelerating the electric vehicle 10, is being pressed down (detect whether an acceleration operation is being performed) and to detect an amount of pressing down the accelerator pedal 21 from an initial position of the accelerator pedal 21 (from a position at a state where the driver has released the pressing down operation).

Acceleration operation information indicative of whether an acceleration operation is being performed, detected by the accelerator pedal sensor 23, and information on the amount of pressing down (AP opening rate information), also detected by the accelerator pedal sensor 23, are transmitted via the communication medium 19 to the vehicle speed control ECU 13, an ABS-ECU 39, and a VSA-ECU 41.

The brake pedal sensor 27 functions to detect whether a brake pedal 25, which is used when braking the electric vehicle 10, is being pressed down (whether a deceleration operation is being performed) and to detect an amount of pressing down the brake pedal 25 from an initial position of the brake pedal 25 (from a position at a state where the driver has released the pressing down operation).

The deceleration operation information indicative of whether a deceleration operation is being performed, detected by the brake pedal sensor 27, and the information on the amount of pressing down, also detected by the brake pedal sensor 27, are transmitted via the communication medium 19 to the vehicle speed control ECU 13, the ABS-ECU 39, and the VSA-ECU 41.

The vehicle speed sensor 29 functions to detect the speed (vehicle speed) of the electric vehicle 10. The vehicle speed information detected by the vehicle speed sensor 29 is transmitted via the communication medium 19 to the vehicle speed control ECU 13, the ABS-ECU 39, and the VSA-ECU 41.

The longitudinal G sensor 31 functions to detect the acceleration/deceleration occurring in the electric vehicle 10 in the longitudinal (forward/reverse) direction. Information on the longitudinal acceleration/deceleration detected by the longitudinal G sensor 31 is transmitted via the communication medium 19 to the vehicle speed control ECU 13, the ABS-ECU 39, and the VSA-ECU 41.

The shift switch 33 is to be operated when changing the advancing direction of the electric vehicle 10 between forward and reverse directions and when changing the driving range. The shift switch 33 is disposed on, for example, a center console (not shown) of the electric vehicle 10. Information on the shift position set by the driver is transmitted via the communication medium 19 to the vehicle speed control ECU 13. The shift positions to be set by the driver include a drive range (D range) and a reverse range (R range).

The deceleration level selector 35 allows the driver to set the magnitude of a deceleration force to be applied to the electric vehicle 10 in a stepwise manner. Note that the deceleration force here is in principle based on a regenerative braking force originating from the motor 45. As illustrated in FIG. 1B, the deceleration level selector 35 is equipped with paddles 35a and 35b serving as operation switches. The paddles 35a and 35b of the deceleration level selector 35 are disposed on spoke portions 22 of the steering wheel 20.

Information on the deceleration force setting information set using the deceleration level selector 35 is transmitted via the communication medium 19 to the vehicle speed control ECU 13, the ABS-ECU 39, and the VSA-ECU 41.

The paddles 35a and 35b of the deceleration level selector 35 correspond to the "deceleration operation element" of the present invention.

As illustrated in FIG. 1, the communication medium 19 is connected with, as the output system 17, the ABS-ECU 39, the VSA-ECU 41, and a motor mechanism 43

The ABS-ECU 39 functions to avoid locking of wheels (not shown) in the event of performing a brake operation of the electric vehicle 10. The VSA-ECU 41 functions to assist stabilizing the behavior of the electric vehicle 10. Note that "VSA" is a registered trademark.

The motor mechanism 43 includes: a motor 45 serving as the drive source of the electric vehicle 10; an inverter 47 that controls driving of the motor 45; and a battery 48 that supplies power to the motor 45 via the inverter 47.

The motor mechanism 43 is connected to drive wheels 49 via a not-shown power transmission mechanism. The motor mechanism 43 functions to drive the electric vehicle 10 based on a deceleration control instruction from the vehicle speed control ECU 13 and to perform regenerative braking as needed.

Internal Configuration of Vehicle Speed Control ECU 13

Next, a description will be given of the internal configuration of the vehicle speed control ECU 13 with reference to FIGS. 1A and 2A to 2C as appropriate.

Figure 2A:
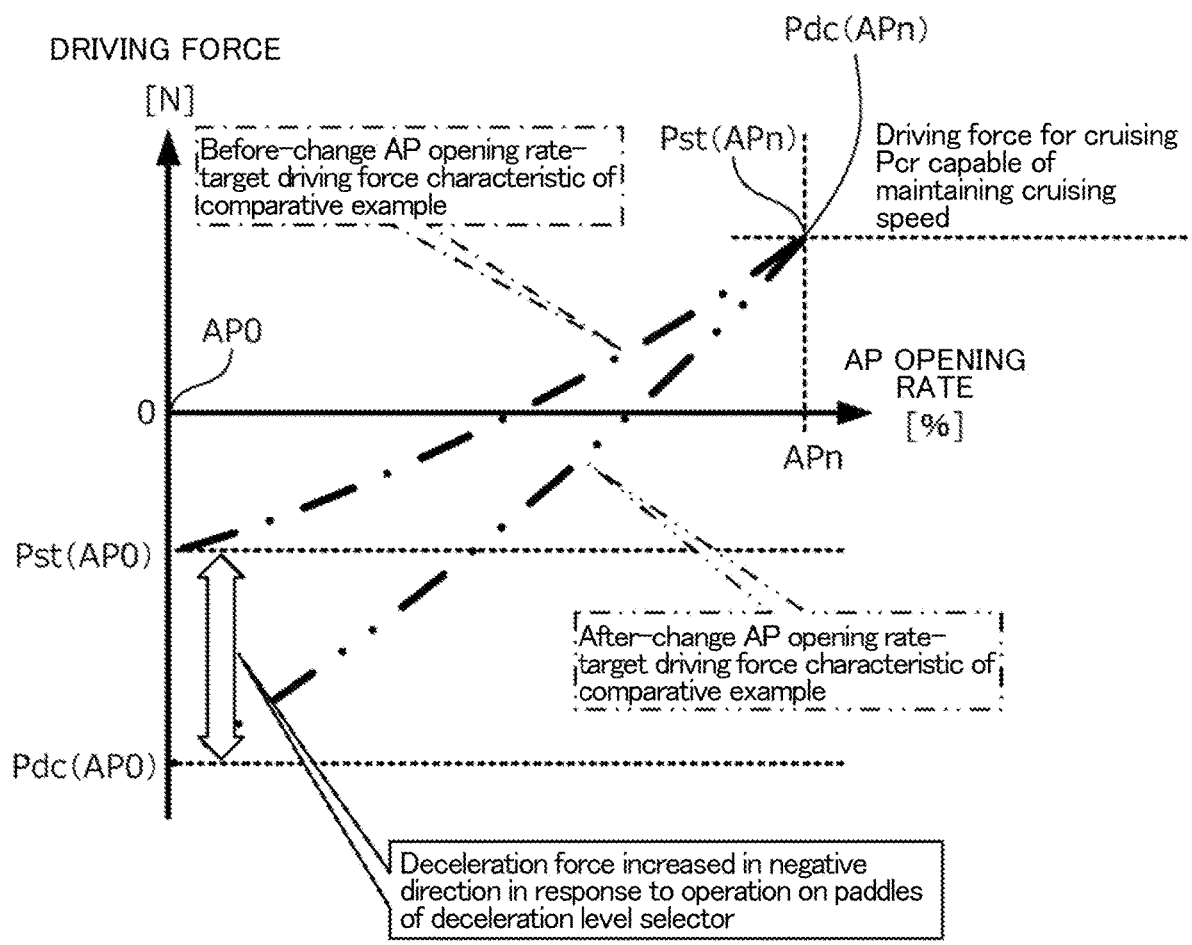
FIG. 2A is an explanatory diagram for explaining the operation of a vehicle speed control device according to a comparative example.
Figure 2B:
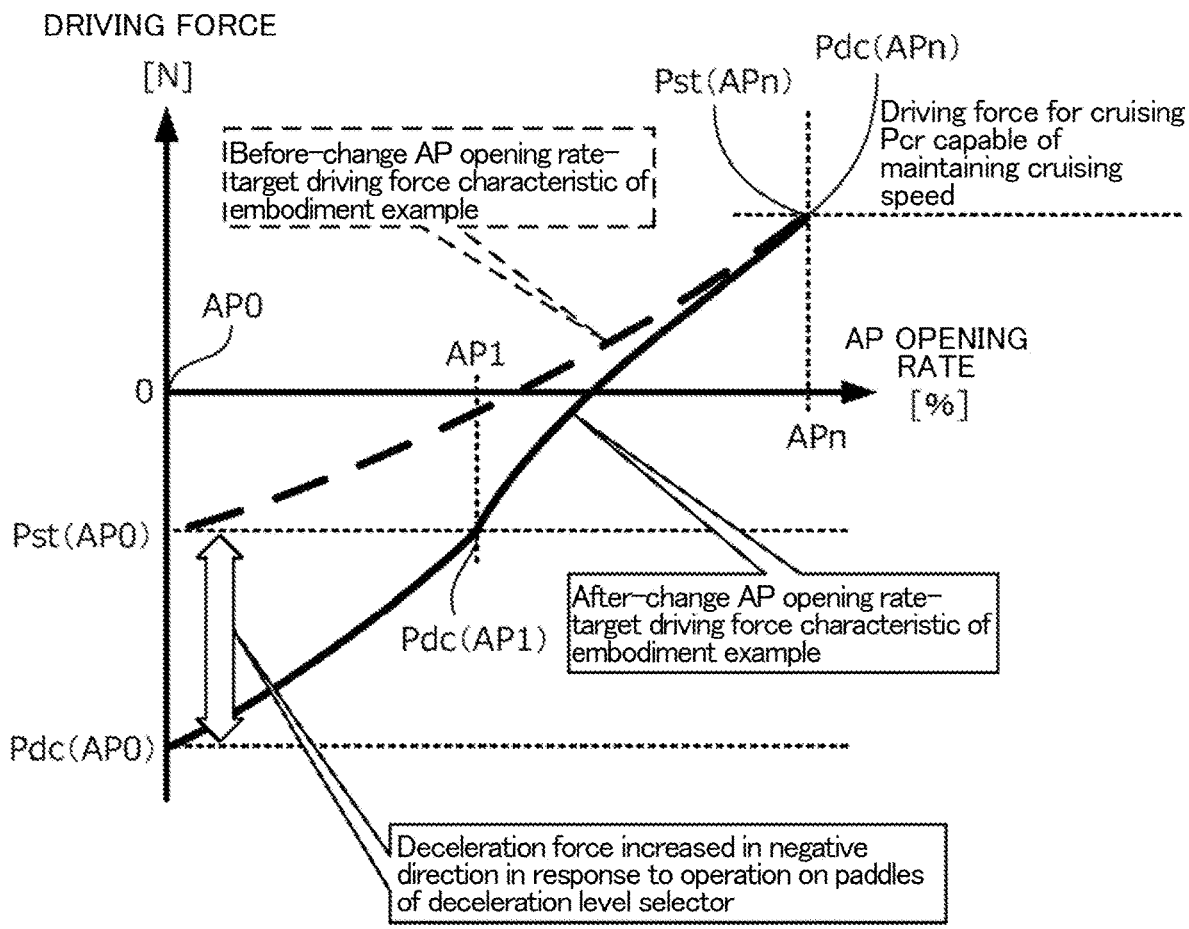
FIG. 2B is an explanatory diagram for explaining the operation of a vehicle speed control device according to an embodiment example.
Figure 2C:
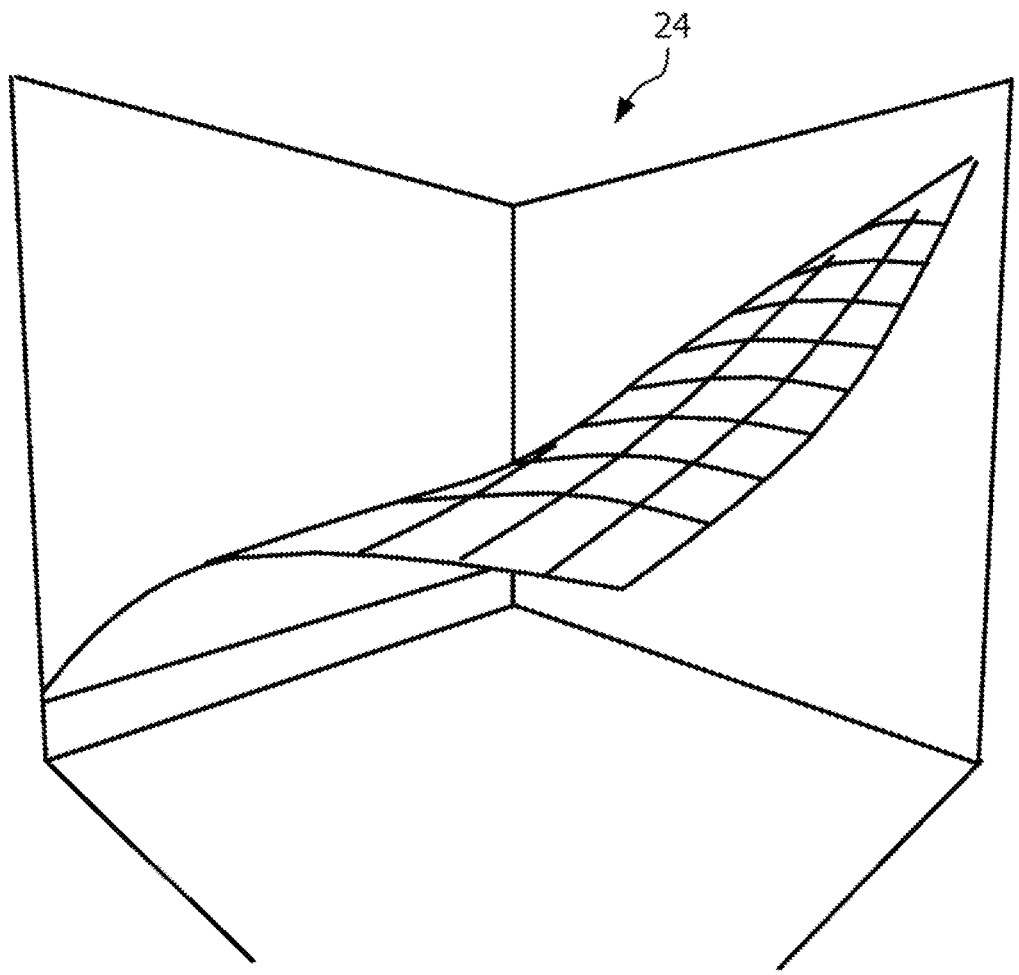
FIG. 2C shows an example of a target driving force characteristic map to be used in the vehicle speed control device according to the embodiment of the present invention when setting a target driving force in response to variation in the AP opening rate and the vehicle speed.
Figure 2C:
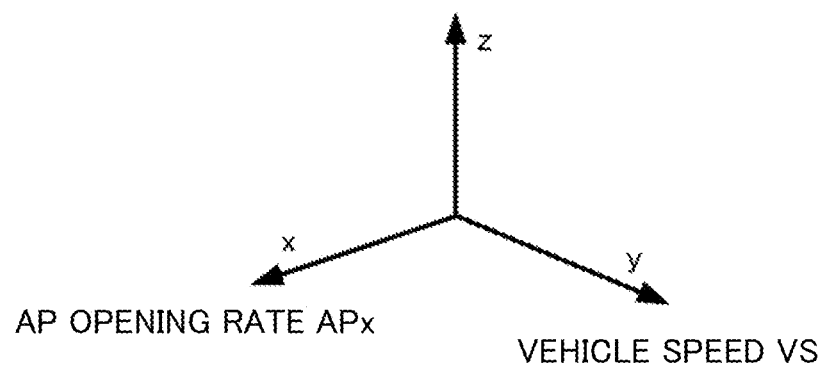

FIG. 2A is an explanatory diagram for explaining the operation of a vehicle speed control device 11 according to a comparative example. FIG. 2B is an explanatory diagram for explaining the operation of a vehicle speed control device 11 according to an embodiment example. FIG. 2C shows an example of a three-dimensional map representing a target driving force characteristic to be used in the vehicle speed control device 11 according to the embodiment of the present invention when setting a target driving force in response to variation in the AP opening rate and the vehicle speed.

As illustrated in FIG. 1A, the vehicle speed control ECU 13 includes an information acquisition section 51, a target driving force setting section 53, and a deceleration controller 55.

Prior to explaining the internal configuration of the vehicle speed control ECU 13, definition of the terms used in the description of the present invention is given to deepen understanding of the vehicle speed control device 11 according to the embodiment of the present invention.

First, the term "a driving force" means a force causing the electric vehicle 10 to run in the advancing direction (forward or reverse direction) by transmitting a drive torque of the motor 45 serving as the drive source to the drive wheels 49.

Here, it should be noted that "a driving force" could mean a force that attempts to causes the electric vehicle 10 to decelerate, in which case the force is in a direction opposite to the advancing direction of the electric vehicle 10. In the case of the vehicle speed control device 11 according to the present invention, in principle, the source of the power that causes to electric vehicle 10 to decelerate is assumed to be the regenerative force of the motor 45.

The idea behind the above statement "in principle, the source of the power that causes to electric vehicle 10 to decelerate is assumed to be the regenerative force of the motor 45" is that, for example, there could be cases where a braking force to be generated by friction braking is used as the source of the deceleration force in place of or in addition to the regenerative force of the motor 45, depending on the charge state of the vehicle-mounted battery (depending on whether the battery is in a full-charge state or the like).

Other forces that cause the electric vehicle 10 to decelerate include: a friction resistance force generated when the drive wheels 49 of the electric vehicle 10 come into contact with the road on which the electric vehicle 10 is traveling; a travel resistive force including a force due to the effects of natural wind on the vehicle body; a friction resistive force originating from mechanical members in the drive mechanism.

The information acquisition section 51 functions to acquire: the acceleration operation information indicative of whether an acceleration operation is being performed, related to the accelerator pedal sensor 23; the information on the amount of acceleration/deceleration operation (AP opening rate information), related to the accelerator pedal sensor 23; the deceleration operation information indicative of whether a deceleration operation is being performed, related to the brake pedal sensor 27; the information on the amount of brake operation (BP operation information), related to the brake pedal sensor 27; the vehicle speed information related to the vehicle speed sensor 29; the longitudinal G information related to the longitudinal G sensor 31; the shift position information related to the shift switch 33; the deceleration force setting information related to the deceleration level selector 35; operation information related to the ABS-ECU 39; operation information related to the VSA-ECU 41; brake control information related to the motor 45; and drive control information related to the motor 45.

The target driving force setting section 53 functions to set a target driving force Ptg based on AP opening rate information APx and vehicle speed information VS, acquired by the information acquisition section 51, for example, with reference to the three-dimensional map 24 illustrated in FIG. 2C.

I should be noted that the embodiment according to the present invention will be described using an example in which the target driving force setting section 53 sets the target driving force Ptg based on at least the AP opening rate information APx. This is based on the fact that the embodiment according to the present invention assumes a mode in which the vehicle speed VS is substantially maintained at a constant value and thus omitting mentioning the vehicle speed VS causes no inconsistency.

As illustrated in FIG. 2A (Comparative Example) and FIG. 2B (Embodiment Example), when the paddle(s) 35a and/or 35b of the deceleration level selector 35 of the electric vehicle 10 is operated for deceleration in a state where the pressing on the accelerator pedal 21 has been released, the deceleration controller 55 changes the AP opening rate-target driving force characteristic set by the target driving force setting section 53, to perform deceleration control using a second deceleration force Pdc (AP0), which is large in the negative direction compared with a first deceleration force Pst (AP0) that is based on the characteristic before change, as the deceleration force to be applied due to release of pressing on the accelerator pedal 21.

Note that, hereinafter, the AP opening rate-target driving force characteristic having been changed is sometimes referred to as "after-change AP opening rate-target driving force characteristic", and the AP opening rate-target driving force characteristic before change is sometimes referred to as "before-change AP opening rate-target driving force characteristic".

In short, as illustrated in FIG. 2A (Comparative Example) and FIG. 2B (Embodiment Example), the increase of the deceleration force increased in the negative direction according to the operation of the paddles of the deceleration level selector 35 corresponds to the deceleration force obtained by subtracting the second deceleration force Pdc (AP0) from the first deceleration force Pst (AP0).

As illustrated in FIG. 2B (Embodiment Example), the deceleration controller 55 terminates the deceleration control when the target driving force Pdc (APx), which is based on a result of applying the AP opening rate APx to the after-change AP opening rate-target driving force characteristic, reaches the target driving force Pst (AP0) that is to be applied at the release of pressing on the accelerator pedal 21 according to the before-change AP opening rate-target driving force characteristic. That is, in the embodiment example shown in FIG. 2B, when the target driving force Pdc (APx) becomes Pdc (AP1), which corresponds to Pst (AP0), the deceleration controller 55 terminates the deceleration control.

At this event, the deceleration controller 55 reverts the value of the target driving force from the target driving force Pdc (AP1), which is based on a result of applying the AP opening rate to the after-change AP opening rate-target driving force characteristic, to the value Pst (AP1), which is based on the before-change AP opening rate-target driving force characteristic. In the case illustrated in FIG. 2B, the target driving force is reverted from Pdc (AP1) to Pst (AP1).

It should be noted that, as illustrated in FIG. 2B (Embodiment Example), when terminating the deceleration control, the deceleration controller 55 gradually reverts the value of the target driving force from the target driving force Pdc (AP1), which is based on a result of applying the AP opening rate to the after-change AP opening rate-target driving force characteristic, to the value Pst (AP1), which is based on the before-change AP opening rate-target driving force characteristic. See the curve along which the value of target driving force varies from Pdc (AP1) to Pdc (APn) based on a result of applying the AP opening rate to the after-change AP opening rate-target driving force characteristic in the embodiment example illustrated in FIG. 2B.

Operation of Vehicle Speed Control Device 11 According to Embodiment of Present Invention Next, a description will be given of the operations of the vehicle speed control device 11 according to the embodiment of the present invention with reference to FIGS. 2A and 2B as appropriate.

Operation of Vehicle Speed Control Device 11 According to Comparative Example First, a description will be given of operations of a vehicle speed control device 11 according to a comparative example, with reference to FIG. 2A.

In FIG. 2A, the vertical axis represents the driving force [unit: N], and the horizontal axis represents the AP opening rate [unit: %]. In FIG. 2A, the region in which the driving force exceeds 0 represents a region a positive driving force is to be applied, whereas the region in which the driving force falls below 0 represents a region a negative driving force, i.e., a deceleration force, is to be applied.

It should be noted that a negative driving force (deceleration force) such as a travel resistive force is steadily applied to the electric vehicle 10 due to natural wind. FIG. 2A shows a driving force for cruising Pcr that may possibly maintain a cruising speed, which may be, though not limited to, 80 km per hour as an example. The above description also applies to FIG. 2B.

In FIG. 2A, a dash-dotted line representing the before-change AP opening rate-target driving force characteristic, according to the comparative example, and a long dashed double-short dashed line representing the after-change AP opening rate-target driving force characteristic, according to the comparative example, are drawn.

The before-change AP opening rate-target driving force characteristic according to the comparative example is represented by an increasing line connecting between a target driving force Pst (AP0) given for an AP opening rate AP0 and a target driving force Pst (APn) given for an AP opening rate APn.

On the other hand, the after-change AP opening rate-target driving force characteristic according to the comparative example is represented by an increasing line connecting between a target driving force Pdc (AP0) given for the AP opening rate AP0 and a target driving force Pdc (APn) given for the AP opening rate APn.

It should be noted here is that, in the cases of the AP opening rate-target driving force characteristics according to the comparative example, the target driving force Pdc (AP0) given for the AP opening rate AP0 is large in the negative direction, i.e., the deceleration force is large, compared with the target driving force Pst (AP0) given for the AP opening rate AP0.

This is useful for cases where the driver wishes to slightly decelerate the vehicle without pressing down the brake pedal 25 as the flow of vehicles begins to stagnate while driving on an expressway at a cruising speed. Specifically, in that case the driver will operate the paddle(s) of the deceleration level selector 35 in a state where the driver has released the pressing on the accelerator pedal 21. Then, an adjustment of increasing the deceleration force, which is based on the regenerative braking force of the motor for traveling, to be applied to the electric vehicle 100 will be performed.

With this, in cases where the driver wishes to slightly decelerate the vehicle without pressing down the brake pedal 25 as the flow of vehicles begins to stagnate while driving on an expressway at a cruising speed, the driver's needs are met.

In the case of vehicle speed control device 11 according to the comparative example, the deceleration control triggered in response to the operation on the paddle(s) of the deceleration level selector 35 is terminated when it can be considered that the stagnation of the flow of vehicles has been resolved, i.e., when the travel state of the electric vehicle 10 has reverted to a state where the electric vehicle 10 is traveling at the original cruising speed. Specifically, the deceleration control triggered in response to the operation on the paddle(s) is terminated when the AP opening rate exceeds a predetermined threshold value corresponding to a value (see APn shown in FIG. 2A) required to maintain a target vehicle speed. At this time, the target driving force Pdc (APn) given by applying the AP opening rate being APn to the after-change AP opening rate-target driving force characteristic of the comparative example has reached the driving force for cruising Pcr shown in FIG. 2A.

In this way, the after-change AP opening rate-target driving force characteristic, which increases responsiveness for the deceleration control performed in response to the paddle operation on the deceleration level selector 35, is reverted to the original, before-change AP opening rate-target driving force characteristic.

Operation of Vehicle Speed Control Device 11 According to Embodiment Example Next, a description will be given of operations of a vehicle speed control device 11 according to an embodiment example with reference to FIG. 2B.

Similarly to FIG. 2A, in FIG. 2B, the vertical axis represents the driving force [unit: N], and the horizontal axis represents the AP opening rate [unit: %]. In FIG. 2B, a dashed line representing the before-change AP opening rate-target driving force characteristic for the embodiment example, and a solid line representing the after-change AP opening rate-target driving force characteristic for the embodiment example, are drawn.

Similarly to the comparative example, the before-change AP opening rate-target driving force characteristic for the embodiment example is represented by an increasing line connecting between a target driving force Pst (AP0) given for an AP opening rate AP0 and a target driving force Pst (APn) given for an AP opening rate APn.

On the other hand, similarly to the comparative example, the after-change AP opening rate-target driving force characteristic for the embodiment example is represented by an increasing line connecting between a target driving force Pdc (AP0) given for the AP opening rate AP0 and a target driving force Pdc (APn) given for the AP opening rate APn.

The embodiment example is also similar to the comparative example in that, in the cases of the AP opening rate-target driving force characteristics of the embodiment example, the target driving force Pdc (AP0) given for the AP opening rate AP0 is large in the negative direction, i.e., the deceleration force is large, compared with the target driving force Pst (AP0) given for the AP opening rate AP0.

The difference between the comparative example and the embodiment example is in that the after-change AP opening rate-target driving force characteristic of the comparative example presents a tendency of substantially linear increase as illustrated in FIG. 2A, whereas the after-change AP opening rate-target driving force characteristic of the embodiment example presents a characteristic such that the characteristic gradually approaches the before-change AP opening rate-target driving force characteristic of the embodiment example, in the region where the AP opening rate has exceeded AP1, in other words, in the region where the target driving force Pdc (AP1) that is based on the after-change AP opening rate-target driving force characteristic has exceeded a value equivalent to the before-change first deceleration force Pst (AP0).

More specifically, in the case of the embodiment example, as illustrated in FIG. 2B, the after-change AP opening rate-target driving force characteristic approaches the before-change AP opening rate-target driving force characteristic following a substantially downward convex curve in the AP opening rate range from Ap0 to AP1, then asymptotically approaches the before-change AP opening rate-target driving force characteristic following a substantially upward convex curve in the AP opening rate range from AP1 to APn, and then intersects the before-change AP opening rate-target driving force characteristic at the point where the AP opening rate is APn. On the other hand, in the case of the comparative example, as illustrated in FIG. 2A, the after-change AP opening rate-target driving force characteristic approaches the before-change AP opening rate-target driving force characteristic following a substantially downward convex curve in the entire AP opening rate range from AP0 to APn, and then intersects the before-change AP opening rate-target driving force characteristic at the point where the AP opening rate is APn.

This is beneficial in that, for example, in cases where the driver wishes to slightly decelerate the vehicle without pressing down the brake pedal 25 as the flow of vehicles begins to stagnate while driving on an expressway at a cruising speed, the after-change AP opening rate-target driving force characteristic, which increases responsiveness for the deceleration control performed in response to the paddle operation on the deceleration level selector 35, is quickly reverted to the original, before-change AP opening rate-target driving force characteristic.

Specifically, the driver will operate the paddle(s) of the deceleration level selector 35 in a state where the driver has released the pressing on the accelerator pedal 21. Then, an adjustment of increasing the deceleration force, which is based on the regenerative braking force of the motor for traveling, to be applied to the electric vehicle 100 will be performed.

With this, in cases where the driver wishes to slightly decelerate the vehicle without pressing down the brake pedal 25 as the flow of vehicles begins to stagnate while driving on an expressway at a cruising speed, the driver's needs are met similarly to the case of comparative example.

In the case of vehicle speed control device 11 according to the embodiment example, the deceleration control triggered in response to the operation on the paddle(s) of the deceleration level selector 35 is terminated when the target driving force Pdc (AP1) that is based on the after-change AP opening rate-target driving force characteristic has reached a value equivalent to the before-change first deceleration force Pst (AP0), i.e., at a sufficiently earlier time than the comparative example.

In this way, the after-change AP opening rate-target driving force characteristic, which increases responsiveness for the deceleration control performed in response to the paddle operation on the deceleration level selector 35, is gradually reverted to the original, before-change AP opening rate-target driving force characteristic.

As the vehicle speed control device 11 according to the embodiment example terminates the deceleration control performed in response to the paddle operation on the deceleration level selector 35 at a sufficiently earlier time than the comparative example and reverts the after-change AP opening rate-target driving force characteristic, which increases responsiveness for the deceleration control performed in response to the paddle operation on the deceleration level selector 35, to the original, before-change AP opening rate-target driving force characteristic, it is possible to achieve vehicle speed control that does not cause the driver to feel sense of discomfort due to the rapid change in the deceleration force.

Other Embodiment

The above-discussed embodiments show an example of how the present invention can be embodied. The embodiments, therefore, shall not be construed as limiting the technical scope of the present invention. The present invention can be carried out in various embodiments without departing from the gist or principal features thereof.

For instance, the embodiments according to the present invention have been described using an example in which a vehicle speed control device 11 according to an embodiment of the present invention is applied to an electric vehicle equipped only with a motor generator as the power source (i.e., an electric vehicle equipped with no internal combustion engine). However, the present invention is not limited to this example. The present invention is applicable to a hybrid vehicle which is equipped with an internal combustion engine and a motor 45 as power sources.

In addition, the embodiments according to the present invention have been described using an example in which a three-dimensional map is used as a tool for setting a target driving force based on the variations in the AP opening rate and the vehicle speed. However, the present invention is not limited to this example. Any form can be used for the tool so long as the tool allows setting the target driving force based on the variations in the AP opening rate and the vehicle speed.

What is claimed is:

1. A vehicle speed control device implemented using one or more hardware processors, the vehicle speed control device comprising:
an information acquisition section implemented using one or more of the one or more hardware processors and configured to acquire information on an AP opening rate representing an opening rate of an accelerator pedal which is to be operated to input a request for accelerating a vehicle;
a target driving force setting section implemented using one or more of the one or more hardware processors and configured to set an AP opening rate-target driving force characteristic representing a target driving force to be applied to the vehicle for at least the AP opening rate; and
a deceleration controller implemented using one or more of the one or more hardware processors and configured to perform deceleration control according to the AP opening rate-target driving force characteristic,
wherein the deceleration controller is further configured to, when a deceleration operation element provided in the vehicle is operated for deceleration in a state where pressing on the accelerator pedal has been released, change the AP opening rate-target driving force characteristic to a second AP opening rate-target driving force characteristic, the AP opening rate-target driving force characteristic before change being a first AP opening rate-target driving force characteristic,
wherein the second AP opening rate-target driving force characteristic represents, for a deceleration force to be applied due to the release of pressing on the accelerator pedal, a second deceleration force larger than a first deceleration force that is based on the first AP opening rate-target driving force characteristic, and
wherein the deceleration controller is further configured to terminate the deceleration control according to the second AP opening rate-target driving force characteristic when a target driving force that is based on a result of applying the AP opening rate to the second AP opening rate-target driving force characteristic has reached a target driving force that is to be applied at the release of pressing on the accelerator pedal according to the first AP opening rate-target driving force characteristic.

2. The vehicle speed control device according to claim 1, wherein when terminating the deceleration control according to the second AP opening rate-target driving force characteristic, the deceleration controller gradually reverts the target driving force that is based on the result of applying the AP opening rate to the second AP opening rate-target driving force characteristic to a value that is based on the first AP opening rate-target driving force characteristic.

* * * * *